(12) United States Patent
Makar et al.

(10) Patent No.: US 6,344,269 B1
(45) Date of Patent: *Feb. 5, 2002

(54) HEAT-TRANSFER LABEL

(75) Inventors: Onsy Y. Makar, Framingham; Samuel H. Stein, Westborough, both of MA (US)

(73) Assignee: Avery Dennison Corporation, Pasadena, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 08/918,903

(22) Filed: Aug. 27, 1997

Related U.S. Application Data (63) Continuation-in-part of application No. 08/763,821, filed on Dec. 11, 1996, now Pat. No. 5,908,694.

(51) Int. Cl.[7] .................................................. C09J 7/02
(52) U.S. Cl. ................. 428/349; 428/354; 428/355 EN; 428/355 N; 524/765; 525/179; 525/292
(58) Field of Search ................. 428/349, 355 EN, 428/354, 355 N; 524/765; 525/179, 292

(56) References Cited

U.S. PATENT DOCUMENTS

| | | | | |
|---|---|---|---|---|
| 3,616,015 A | * | 10/1971 | Kingston | 156/230 |
| 3,922,435 A | * | 11/1975 | Asnes | 428/349 |
| 4,426,422 A | * | 1/1984 | Daniels | |
| 4,548,857 A | * | 10/1985 | Galante | |
| 4,935,300 A | * | 6/1990 | Parker et al. | 428/352 |
| 5,908,694 A | * | 6/1999 | Makar et al. | 428/349 |

OTHER PUBLICATIONS

Witco Polymer Additives Technical Information AMD:510, Witco Corp., Memphis TN (May, 1995).
Humko Chemical Technical Information AMD:512, Witco Chemical Corp., Memphis, TN (Jan., 1981).
Humko Chemical Technical Information AMD:503, Witco Chemical Corp., Memphis, TN (May, 1982).
Technical literature for SANTICIZER 0160 plasticizer, Monsanto Co., St. Louis, MO Feb. 22, 1995).

* cited by examiner

*Primary Examiner*—Jenna Davis
(74) *Attorney, Agent, or Firm*—Kriegsman & Kriegsman (57) ABSTRACT

A heat-transfer label that is well-suited for use on untreated polyethylene, particularly untreated high-density polyethylene and untreated low-density polyethylene. In one embodiment, the label includes a support portion, the support portion comprising a paper carrier web. The label also includes a wax release layer overcoating the paper carrier web. The label further comprises a transfer portion printed on top of the wax release layer, the transfer portion including a protective lacquer layer, an ink layer and an adhesive layer. The protective lacquer layer is printed onto the wax release layer and comprises a polyester resin, castor oil and a chlorinated polypropylene capable of immobilizing the ink layer relative to the protective lacquer. The ink layer, which comprises an acrylic ink, is printed onto the protective lacquer layer. The adhesive layer is printed over the ink layer and comprises a polyamide resin, an ethylene vinyl acetate resin, erucamide and a chlorinated polyethylene resin.

32 Claims, 2 Drawing Sheets

HEAT-TRANSFER LABEL

CROSS-REFERENCE TO RELATED APPLICATIONS

The present application is a continuation-in-part of U.S. patent application Ser. No. 08/763,821, filed Dec. 11, 1996, now U.S. Pat. No. 5,908,694 which is incorporated herein by reference.

BACKGROUND OF THE INVENTION

The present invention relates generally to heat-transfer labels and more particularly to a novel heat-transfer label particularly well-suited for use on untreated polyethylene surfaces and the like.

Heat-transfer labels are commonly used in the decorating and/or labelling of commercial articles, such as, and without limitation to, containers for beverages, essential oils, detergents, adverse chemicals, and health and beauty aids, as well as flat surfaces. As can readily be appreciated, heat-transfer labels are desirably resistant to abrasion and chemical effects in order to avoid a loss of label information and desirably possess good adhesion to the articles to which they are affixed.

One well-known type of heat-transfer label is described in U.S. Pat. No. 3,616,015, inventor Kingston, which issued October, 1971, and which is incorporated herein by reference. In the aforementioned patent, there is disclosed a heat-transfer label comprising a paper sheet or web, a wax release layer affixed to the paper sheet, and an ink design layer printed on the wax release layer. In the heat-transfer labelling process, the label-carrying web is subjected to heat, and the label is pressed onto an article with the ink design layer making direct contact with the article. As the paper sheet is subjected to heat, the wax layer begins to melt so that the paper sheet can be released from the ink design layer, a portion of the wax layer being transferred with the ink design layer and a portion of the wax layer remaining with the paper sheet. After transfer of the design to the article, the paper sheet is immediately removed, leaving the design firmly affixed to the article and the wax transferred therewith exposed to the environment. The wax layer is thus intended to serve two purposes: (1) to provide release of the ink design from the web upon application of heat to the web and (2) to form a protective layer over the transferred ink design. After transfer of the label to the article, the transferred wax release layer is typically subjected to a post-flaming technique which enhances the optical clarity of the wax protective layer (thereby enabling the ink design layer therebeneath to be better observed) and which enhances the protective properties of the transferred wax release.

In some heat-transfer labels, an adhesive layer (e.g., solvent-soluble polyamide, acrylic or polyester) is deposited over the ink design to facilitate adhesion of the label onto a receiving article. An example of a heat-transfer label having an adhesive layer is disclosed in U.S. Pat. No. 4,548,857, inventor Galante, which issued Oct. 22, 1985, and which is incorporated herein by reference. Additionally, in some heat-transfer labels, a protective lacquer layer is interposed between the wax release layer and the ink layer. An example of such a label is disclosed in U.S. Pat. No. 4,426,422, inventor Daniels, which issued Jan. 17, 1984, and which is incorporated herein by reference.

One phenomenon that has been noted with heat-transfer labels of the type described above containing a wax release layer is that, quite often, a degree of hazing or a "halo" is noticeable over the transferred label when the transfer is made onto clear materials. This "halo" effect, which persists despite post-flaming and which may detract from the appearance of the label, is a result of the nature of the wax coating around the outer borders of the transferred ink design layer. Hazing due to the wax release layer may also appear in "open-copy" areas of the label, i.e., areas of the label where no ink is present between the adhesive and protective lacquer layers, and also may detract from the appearance of the label.

In addition to and related to the aforementioned problem of hazing, when heat-transfer labels of the type described above are applied to dark-colored containers, the outer wax layer of the label often appears as a whitish coating on the container, which effect is undesirable in many instances. Furthermore, scratches and similar abrasions to the outer wax layer of the label can occur easily and are readily detectable.

Accordingly, to address the aforementioned issues, considerable effort has been expended in replacing or obviating the need for a wax release layer. One such wax-less, heat-transfer label is disclosed in U.S. Pat. No. 3,922,435, inventor Asnes, which issued Nov. 25, 1975. In the aforementioned patent, the layer of wax is replaced with a layer of a non-wax resin. This non-wax resinous layer is referred to in the patent as a dry release since it does not transfer to the article along with the ink design layer. In a preferred embodiment of the patent, the non-wax resinous layer comprises a thermoset polymeric resin, such as cross-linked resins selected from the group consisting of acrylic resins, polyamide resins, polyester resins, vinyl resins and epoxy resins.

Another example of a wax-less, heat-transfer label is disclosed in U.S. Pat. No. 4,935,300, inventors Parker et al., which issued Jun. 19, 1990, and which is incorporated herein by reference. In the aforementioned patent, the label, which is said to be particularly well-suited for use on high density polyethylene, polypropylene, polystyrene, polyvinylchloride and polyethylene terephthalate surfaces or containers, comprises a paper carrier web which is overcoated with a layer of polyethylene. A protective lacquer layer comprising a polyester resin and a relatively small amount of a non-drying oil is printed onto the polyethylene layer. An ink design layer comprising a resinous binder base selected from the group consisting of polyvinylchloride, acrylics, polyamides and nitrocellulose is then printed onto the protective lacquer layer. A heat-activatable adhesive layer comprising a thermoplastic polyamide adhesive is then printed onto the ink design layer.

Although the above-described wax-less, heat-transfer label substantially reduces the wax-related effects discussed previously, said label does not quite possess the same release characteristics of heat-transfer labels containing a wax release layer. Accordingly, another type of heat-transfer label differs from the heat-transfer label disclosed in U.S. Pat. No. 4,935,300, only in that a very thin layer or "skim coat" of a waxlike material is interposed between the polyethylene release layer and the protective lacquer layer to improve the release of the protective lacquer from the polyethylene-coated carrier web. The thickness of the skim coat corresponds to approximately 0.1–0.4 lbs. of the wax-like material spread onto about 3000 square feet of the polyethylene release layer.

An example of the aforementioned type of heat-transfer label, which has been used by the assignee of the present application to label polypropylene bottle caps, comprises a paper carrier web overcoated with a layer of polyethylene.

A skim coat is overcoated on the polyethylene layer. A protective lacquer layer comprising vinyl and polyester resins is printed on the skim coat. An ink design layer comprising vinyl and polyester resins is printed on the protective lacquer layer. A heat-activatable adhesive layer comprising an acrylic resin, a chlorinated polyolefin and a plasticizer is printed on the ink design layer. The acrylic resin is a butyl methacrylate resin, such as ELVACITE® 2045, which is commercially available from ICI Acrylics Inc. (Wilmington, Del.). The chlorinated polyolefin is commercially available from Eastman Chemical Products, Inc. (Kingsport, Tenn.) as chlorinated polyolefin CP-343-1. The plasticizer is a glyceryl tribenzoate, such as BENZOFLEX® S-404, which is commercially available from Velsicol Chemical Corporation (Chicago, Ill.).

Heat-transfer labels of the types described above, both of the wax-release variety and of the skim-coat variety, have been used to decorate a variety of articles, including high-density polyethylene (HDPE) containers and low-density polyethylene (LDPE) containers. One example of a heat-transfer label which has been used by the assignee of the present application to decorate polyethylene (PE) containers comprises a paper carrier web overcoated with a wax release layer (approximately 6–8 lbs. wax/3000 square feet of paper carrier web). A protective lacquer layer comprising a polyester resin is printed on the skim coat. An ink design layer comprising a polyamide resin is printed on the protective lacquer layer. A heat-activatable adhesive layer comprising a polyamide resin is printed on the ink design layer.

One disadvantage associated with the use of the aforementioned label on polyethylene is that said label will not adhere to a polyethylene surface unless the polyethylene surface has previously been treated by some oxidizing technique. Typical oxidizing techniques include subjecting the polyethylene surface to corona discharge or flaming the surface with an oxidizing flame. Without wishing to be limited to any particular theory as to why pre-treatment of the polyethylene surface is necessary for the aforementioned label to adhere thereto, it is believed that untreated polyethylene is a low energy surface made up primarily of hydrocarbons whereas oxidized or treated polyethylene is a relatively higher energy surface which additionally includes ketones, carboxylic acid groups, etc. Accordingly, because the pre-treated polyethylene surface is a higher energy surface than the untreated polyethylene surface, it is more receptive to binding to the polyamide adhesive layer of the above-described label.

Another disadvantage associated with the aforementioned label is that said label, when applied to treated polyethylene, readily suffers degradation and separation from its associated polyethylene surface when the labelled polyethylene surface is "wet-flexed." "Wet-flexing" typically comprises soaking a labelled polyethylene container in a cool water bath having a sonicator for about 20 minutes, repeatedly squeezing or bending the container for a period of time, and then subjecting the container to a "tape test." A "tape test," which can be performed independently of any prior wet-flexing, involves applying a strip of adhesive tape (such as 610 adhesive tape, which is commercially available from 3M) to the label, removing the strip of tape from the container, and then visually assessing the integrity of the label. As can readily be appreciated, the inability of a label to withstand "wet-flexing" limits the usefulness of such a label on polyethylene containers of the type that are frequently squeezed under wet conditions. Because high density polyethylene containers are considerably more rigid than low density polyethylene containers and are not typically intended for applications where they will be squeezed repeatedly, the ability of a label to withstand "wet-flex" is typically less important for high density polyethylene containers than for low density polyethylene containers.

Another example of a heat-transfer label which has been used by the assignee of the present application to decorate treated polyethylene containers differs from the above-described label in that its adhesive layer comprises a different type of polyamide resin and in that its protective lacquer layer comprises a different type of polyester resin. Said label, however, also suffers from the disadvantage that it will not adhere to untreated polyethylene. Nevertheless, if a polyethylene container is pretreated under appropriate conditions, said label will adhere thereto and the resultant labelled container will pass "wet-flex."

SUMMARY OF THE INVENTION

It is an object of the present invention to provide a novel heat-transfer label.

It is another object of the present invention to provide a heat-transfer label as described above that overcomes at least some of the problems discussed above in connection with the decoration of polyethylene surfaces.

It is still another object of the present invention to provide a heat-transfer label as described above that is particularly well-suited for use on untreated polyethylene surfaces, such as untreated high-density polyethylene surfaces and/or untreated low-density polyethylene surfaces.

Additional objects, as well as features, advantages and aspects of the present invention, will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

According to one aspect of the invention, there is provided a heat-transfer label that is particularly well-suited for use in decorating untreated polyethylene surfaces, said heat-transfer label comprising (a) a support portion; and (b) a transfer portion over said support portion for transfer of the transfer portion from the support portion to an article upon application of heat to the support portion while the transfer portion is placed into contact with the article, said transfer portion comprising (i) an ink design layer, and (ii) an adhesive layer over said ink design layer, said adhesive layer comprising a chlorinated polyethylene resin preferably of the type present in Eastman Chemical Products, Inc.'s CP-153-2 chlorinated polyolefin solution, a polyamide resin preferably of the type commercially available as VERSA-MID® 756 alcohol soluble polyamide resin and an ethylene vinyl acetate resin, such as ELVAX® 40-W ethylene vinyl acetate resin. Said adhesive layer preferably further comprises an anti-blocking agent preferably in the form of erucamide (e.g., KEMAMIDE E ULTRA erucamide).

In a first preferred embodiment of the above-described heat-transfer label, which embodiment is particularly well-suited for use in decorating untreated high-density polyethylene surfaces, said heat-transfer label comprises (a) a support portion; (b) a transfer portion over said support portion for transfer of the transfer portion from the support portion to an article upon application of heat to the support portion while the transfer portion is placed into contact with the article, said transfer portion comprising (i) a protective lacquer layer, said protective lacquer layer comprising a release agent and at least one of a hard polyester resin and an acrylic resin, (ii) an ink layer over said protective lacquer layer, said ink layer comprising a polyamide ink, and (iii) an adhesive layer of the type described above; and (c) a wax-like skim coat interposed between said support portion and said transfer portion.

Preferably, said release agent of said protective lacquer layer comprises a surfactant, such as AEROSOL® OT-MSO dioctyl sodium sulfosuccinate in mineral seal oil or UNITHOX™ ethoxylated alcohol, or a wax, such as carnauba wax, with dioctyl sodium sulfosuccinate in mineral seal oil being most preferred. Said hard polyester or vinyl resin of said protective lacquer layer preferably is a polyester resin of the type commercially available as ViTEL® 2300 polyester resin. Said protective lacquer layer preferably additionally comprises nitrocellulose and castor oil.

Preferably, said polyamide ink comprises a polyamide resin of the type commercially available as VERSAMID® 930 or 940 polyamide resin and preferably further includes nitrocellulose.

Preferably, said support portion of the above-described heat-transfer label comprises polyethylene-coated paper.

In a second preferred embodiment of the above-described heat-transfer label, which embodiment is particularly well-suited for use in decorating untreated high-density and low-density polyethylene surfaces (especially low-density polyethylene surfaces), said heat-transfer label comprises (a) a support portion; (b) a transfer portion over said support portion for transfer of the transfer portion from the support portion to an article upon application of heat to the support portion while the transfer portion is placed into contact with the article, said transfer portion comprising (i) a protective lacquer layer, said protective lacquer layer comprising a chlorinated polypropylene and at least one of a hard polyester resin and an acrylic resin, (ii) an ink layer over said protective lacquer layer, said ink layer comprising an acrylic ink, and (iii) an adhesive layer of the type described above; and (c) a wax release layer interposed between said support portion and said transfer portion.

Preferably, said chlorinated polypropylene of said protective lacquer layer is preferably of the type commercially available as Eastman Chemical Products, Inc.'s CP343-1 chlorinated polyolefin. Said hard polyester or acrylic resin of said protective lacquer layer preferably is a polyester resin of the type commercially available as ViTEL® 2300 polyester resin. Said protective lacquer layer preferably additionally comprises castor oil.

Preferably, said acrylic ink includes an acrylic resin of the type commercially available as ELVACITE® 2013 or 2045 acrylic resin, with ELVACITE® 2013 acrylic resin being particularly preferred.

Preferably, said support portion of the aforementioned heat-transfer label is a sheet of paper, with said wax release layer overcoating said sheet of paper.

In addition to being directed to the above-described heat-transfer label, the present invention is also directed to the transfer portion of the heat-transfer label, as well as to the adhesive layer of the transfer portion, to an adhesive composition for forming the adhesive layer, to the protective lacquer layer of the transfer portion, to a composition for forming the protective lacquer layer, and to a method of labelling an untreated polyethylene surface with the above-described heat-transfer label.

For purposes of the present specification and claims, it is to be understood that certain terms used herein, such as "on" or "over," when used to denote the relative positions of two or more layers of a heat-transfer label, are primarily used to denote such relative positions in the context of how those layers are situated prior to transfer of the transfer portion of the label to an article since, after transfer, the arrangement of layers is inverted as those layers which were furthest removed from the associated support sheet are now closest to the labelled article.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts.

DETAILED DESCRIPTION OF PREFERRED EMBODIMENTS

Figure 1:
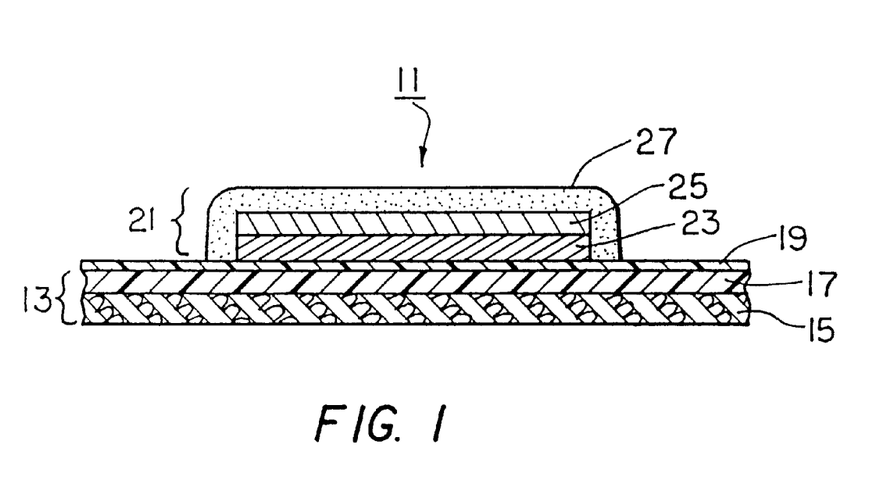
FIG. 1 is a schematic section view of a first embodiment of a heat-transfer label that is particularly well-suited for use on untreated polyethylene surfaces, the heat-transfer label being constructed according to the teachings of the present invention.

Referring now to FIG. 1, there is shown a schematic section view of a first embodiment of a heat-transfer label that is particularly well-suited for use on untreated polyethylene surfaces, particularly untreated high-density polyethylene containers, the heat-transfer label being constructed according to the teachings of the present invention and being represented generally by reference numeral 11.

Label 11 comprises a support portion 13. Support portion 13, in turn, preferably comprises a carrier web 15, which is typically paper or a similarly suitable substrate, and a nonwax release layer 17, which is overcoated onto carrier web 15. (In an alternative .embodiment, carrier web 15 may be omitted from support portion 13.) Preferably, nonwax release layer 17 comprises a layer of polyethylene or a layer of polypropylene, with polyethylene being the more preferred material. Details of polyethylene layer 17 are disclosed in U.S. Pat. No. 4,935,300, discussed above, and in U.S. Pat. No. 4,927,709, inventors Parker et al., which issued on May 22, 1990, and which is incorporated herein by reference.

Label 11 also preferably comprises a skim coat 19 of the type described above, skim coat 19 being coated directly on top of the entirety of nonwax release layer 17. During label transfer, a small portion of skim coat 19 may be transferred along with the transfer portion of label 11 onto the article being labelled, the amount of skim coat 19 transferred onto the article being labelled not being readily discernible.

Label 11 further comprises a transfer portion 21. Transfer portion 21, in turn, preferably includes a protective lacquer layer 23 printed directly on top of at least a portion of skim coat 19, an ink design layer 25 printed onto a desired area of lacquer layer 23, and a heat-activatable adhesive layer 27 printed over design layer 25 and onto a surrounding portion of skim coat 19.

Protective lacquer layer 23 preferably comprises a release agent and at least one of a hard polyester resin or an acrylic resin. An example of the hard polyester resin is ViTEL® 2300 (Shell Chemical Company, Akron, Ohio)—a copolyester resin having a high tensile strength of 8000 psi, a low elongation of 7%, a 79 D scale Shore Durometer hardness, and a 156° C. ring and ball melt flow point. An example of the release agent is a surfactant of the type commercially available as AEROSOL® OT-MSO dioctyl sodium sulfosuccinate in mineral seal oil (Cytec Industries, West Paterson, N.J.). Another example of the release agent is UNITHOX™ 750 ethoxylated alcohol (Petrolite Corporation, Tulsa, Okla.), which is described in Petrolite Corporation's Technical Release 4001.0, dated September, 1988, the disclosure of which is incorporated herein by reference. Other examples of the release agent include waxes, such as carnauba wax.

Without wishing to be limited to any particular theory of the invention, it is believed that the aforementioned release agent plays a very important role in the protective lacquer layer, the release agent being believed to perform one or more of the following functions: (1) together with skim coat 19, helping to release transfer portion 21 from support 13; (2) promoting interlayer adhesion between the protective lacquer layer and ink design layer 25; (3) especially where the release agent is a wax, after transfer of transfer portion 21, helping to protect transfer portion 21 from external chemical and/or mechanical degradation (as measured, for example, by a tape test); and (4) especially where the release agent is a surfactant, acting as a wetting agent to promote good printing of lacquer layer 23 onto skim coat 19 and good printing of ink layer 25 onto lacquer layer 23.

An example of a preferred lacquer composition for use in forming lacquer layer 23 is the following:

| Component | Percentage by weight |
| --- | --- |
| ViTEL ® 2300 | 21.4 |
| nitrocellulose | 4.5 |
| AEROSOL ® OT-MSO dioctyl sodium sulfosuccinate in mineral seal oil | 4.5 |
| castor oil | 0.9 |
| toluene | 27.4 |
| methyl ethyl ketone (MEK) | 20.4 |
| ethyl acetate | 20.4 |

An example of another preferred lacquer composition for use in forming lacquer layer 23 is the following:

| Component | Percentage by weight |
| --- | --- |
| ViTEL ® 2300 | 22.5 |
| AEROSOL ® OT-MSO dioctyl sodium sulfosuccinate in mineral seal oil | 4.7 |
| castor oil | 0.94 |
| toluene | 28.8 |
| methyl ethyl ketone (MEK) | 21.4 |
| ethyl acetate | 21.4 |

Other suitable examples, albeit not as preferred as the foregoing examples (in terms of the release and adhesion characteristics of the resultant lacquer layer 23, in particular, and the resultant transfer portion 21, in general), of lacquer compositions for use in forming lacquer layer 23 are the following:

| ALTERNATIVE NO.1 | |
| --- | --- |
| Component | Percentage by weight |
| ViTEL ® 2300 | 23.5 |
| castor oil | 1.07 |
| toluene | 30.1 |
| methyl ethyl ketone (MEK) | 22.5 |
| ethyl acetate | 22.5 |

Then, carnauba wax or UNITHOX 750 polyethylene wax is added to the aforementioned mixture in an amount constituting 7%, by weight, of the total composition.

| ALTERNATIVE NO.2 | |
| --- | --- |
| Component | Percentage by weight |
| BOSTIK 7922 polyester resin (a semi-crystalline, linear saturated polyester available from Emhart Corporation having a hardness of 65 Shore A, a specific gravity of 1.23, a softening range (R & B) of 275° F.–297° F., a solution viscosity (30% solids in 50/50 MEK/Toluol) of 60–200 cps and a solution viscosity (30% solids in ethyl acetate) of approximately 300–400 cps) | 20 |
| VAGH vinyl resin (a vinyl resin solution available from Union Carbide Chemicals, Danbury, CT having a polymer composition by % wt of 90 VCl, 4 VAc and 6 vinyl alcohol, an average molecular weight of 27,000, a glass transition temperature of 79° C., a specific gravity ASTM D792 of 1.39 and a solution viscosity at 25° C. of 1000 cP) | 5 |
| nitrocellulose | 1.7 |
| castor oil | 0.8 |
| UNITHOX 750 ethoxylated alcohol | 7 |
| MEK | 26.2 |
| toluene | 19.6 |
| ethyl acetate | 19.6 |

Still yet another alternative example, which is not as preferred as the first lacquer composition described above, comprises the lacquer composition used to make label 11 of U.S. Ser. No. 08/625,013 (the disclosure of which is incorporated herein by reference), to which carnauba wax or UNITHOX 750 ethoxylated alcohol has been added.

To form lacquer layer 23 using any of the aforementioned lacquer compositions, the lacquer composition is deposited onto a desired area of skim coat 19, preferably by gravure printing or a similar technique. After deposition of the lacquer composition onto the desired area of skim coat 19, the deposited layer is heated, causing the volatile components thereof to evaporate and leaving only the non-volatile components thereof to make up lacquer layer 23.

Ink design layer 25 of transfer portion 21 preferably comprises a conventional polyamide ink, which may take the form described in one or more of the above-referenced patents. Ink design layer 25 is formed in the conventional manner by depositing, by gravure printing or the like, an ink composition comprising a polyamide resin (e.g., VERSAMID® 930 or 940 polyamide resin), nitrocellulose, a suitable pigment or dye and one or more suitable volatile solvents onto one or more desired areas of lacquer layer 23. After application of the ink composition onto lacquer layer 23, the deposited layer is heated, causing the volatile solvent component(s) of the ink solvent system to evaporate and leaving only the non-volatile components thereof to form layer 25.

Adhesive layer 27 of transfer portion 21 preferably comprises a soft polyamide resin, a chlorinated polyolefin of the type that binds well to polyethylene, an ethylene vinyl acetate resin and an anti-blocking agent preferably in the form of a wax-like amide, such as erucamide.

An example of the soft polyamide resin of adhesive layer 27 is VERSAMID® 756 polyamide resin, a clear alcohol soluble polyamide resin commercially available from Henkel Corp. (Minneapolis, Minn.), based on dimerized vegetable acid and aliphatic polyamines and having a Brookfield viscosity at 160° C. of 4–7 poise, a softening point of 105–115° C. and a Gardner color (maximum) of 7. An example of the chlorinated polyolefin is the chlorinated polyethylene of Eastman Chemicals Products, Inc.'s CP-153-2 chlorinated polyolefin solution, a 25% solution of chlorinated polyethylene in xylene having a specific gravity at 25/25° C. of 0.970, a Brookfield viscosity at 25° C., of 500–800 cP, a flash point, Tag Closed Cup, of 81° F., a fire point of 86° F. and a Gardner color of 12–15 (see Eastman Chemicals Publication No. GN-319B, August 1984, which is incorporated herein by reference). An example of the ethylene vinyl acetate resin is ELVAX® 40-W, a 39–42% vinyl acetate, medium to low viscosity (0.70 cP at 30° C. and 0.25 g 1100 ml toluene) resin commercially available from ICI Acrylics Inc. (Wilmington, Del.), which is soluble in organic solvents and has a bulk density of 30 lb/ft$^3$ (ASTM-D 1895/B), a ring and ball softening point of 200° C. and a melt index of 48–66 grams per 10 minutes (ASTM-D 1238 modified).

All three of the soft polyamide resin, chlorinated polyethylene and ethylene vinyl acetate described above are tacky, aggressively-adhesive resins which function individually as adhesives and/or adhesion promoters. The present inventors have found, however, that the three aforementioned resins, when combined together, unexpectedly and synergistically adhere well to untreated polyethylene in a way not experienced when one or more of said three resins is removed therefrom.

Examples of the erucamide anti-blocking agent include KEMAMIDE® E erucamide, KEMAMIDE® E ULTRA erucamide, KEMAMIDE® Oerucamide and KEMAMIDE® U erucamide (all of which are available from Witco Chemical Corp., Memphis, Tenn.). Of the foregoing varieties of erucamide, KEMAMIDE E® ULTRA erucamide, which is described in Witco Polymer Additives Technical Information No. 510, published May, 1995, which is incorporated herein by reference, and KEMAMIDE E® erucamide are the most preferred. The aforementioned anti-blocking agent raises the activation temperature of adhesive layer 27 to a temperature in the range typically encountered under decorating conditions and, therefore, serves to prevent adhesive layer 27 from adhering to undesired articles, such as to the underside of support portion 13, when a length of label 11 is wound into a roll, i.e., when not in use.

A preferred example of an adhesive composition which may be used to form adhesive layer 27 has the following composition:

| Component | Percentage by weight |
|---|---|
| VERSAMID ® 756 polyamide resin | 12.4 |
| ELVAX ® 40-W ethylene vinyl acetate resin | 6.2 |
| KEMAMIDE ® E ULTRA erucamide | 0.54 |
| toluene | 43.2 |
| isopropyl alcohol | 12.5 |
| ethyl acetate | 12.5 |
| CP-153-2 chlorinated polyethylene solution | 12.4 |

To prepare the foregoing composition, all of the ingredients, except for the CP-153-2 chlorinated polyethylene solution, are combined together and mixed well (i.e., until solids dissolve). Then, the CP-153-2 chlorinated polyethylene solution is added thereto. The solids content for the composition is 22.2%; D.C. viscosity is 18–20 seconds.

An alternative preferred example of an adhesive composition which may be used to form adhesive layer 27 has the following composition:

| Component | Percentage by weight |
|---|---|
| VERSAMID ® 756 polyamide resin | 11.38 |
| ELVAX ® 40-W ethylene vinyl acetate resin | 5.75 |
| CP-153-2 chlorinated polyethylene solution | 11.35 |
| KEMAMIDE ® E erucamide | 1.9 |
| toluene | 43.9 |
| isopropyl alcohol | 12.8 |
| ethyl acetate | 12.8 |

Adhesive layer 27 is formed by depositing onto ink layer 25, by gravure printing or the like, the aforementioned adhesive composition. The deposited composition is then heated, causing the volatile components of the composition to evaporate and leaving only the non-volatile solid components thereof to form layer 27.

Label 11 is particularly well-suited for use with untreated high-density polyethylene articles, including untreated HDPE containers. Application of label 11 to such items is preferably performed in the conventional thermal-transfer manner by contacting adhesive layer 27 to the untreated high-density polyethylene container or other article, while applying sufficient heat to the bottom of carrier web 15 so as to cause transfer portion 21 (and possibly a portion of skim coat 19) to be released from support portion 13 and so as to cause adhesive layer 27 to become heat-activated for bonding of transfer portion 21 to the desired article.

A particular embodiment of label 11 comprising (i) an adhesive layer 27 formed using the above-described preferred adhesive composition, (ii) a conventional polyamide ink layer 25, (iii) a protective lacquer layer 23 formed using the above-described preferred lacquer composition, (iv) a wax-like skim coat 19 and (v) a support 13 comprising polyethylene coated paper was used to decorate an untreated high-density polyethylene container by conventional thermal transfer. The transfer portion 21 of said label released well from said support 13 during thermal transfer, and the thus transferred transfer portion 21 exhibited good interlayer adhesion and good adhesion to the HDPE container, as measured by tape test.

As mentioned above , one distinct advantage of label 11 over existing heat-transfer labels used on high-density polyethylene articles is the fact that label 11 does not require any oxidizing pre-treatment of the aforementioned high-density polyethylene container for transfer portion 21 to adhere thereto. As a result, the time necessary to pretreat the container and the particular equipment needed for pretreatment can be eliminated, resulting in considerable savings.

Although label 11 is particularly well-suited for decorating untreated high-density polyethylene articles, label 11 can also be used to decorate untreated low-density polyethylene articles, provided that "hot-stamping" or a similar transfer technique imparting sufficient support to the article being labelled during transfer is used. It should be noted, however, that the aforementioned requirement will, to a considerable extent, limit the applicability of label 11 to untreated LDPE having the shape of a flat surface, as opposed to that of a container. It should also be noted that untreated LDPE articles thus labelled with label 11, while able to pass a tape test when dry, do not pass "wet flex."

Figure 2:
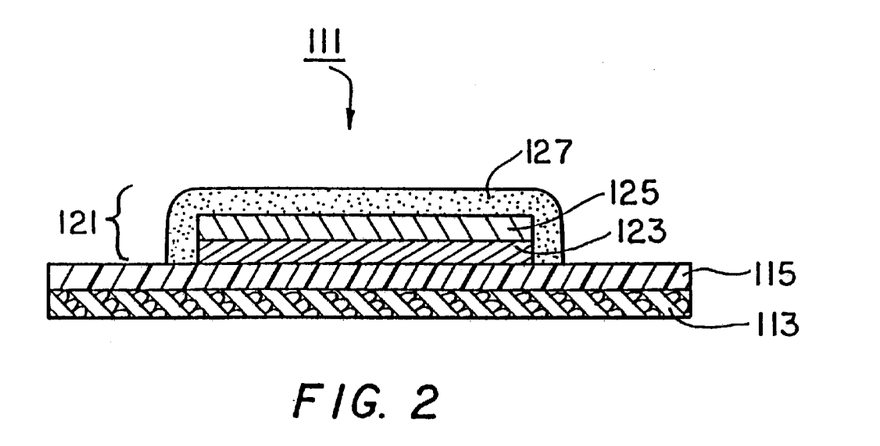
FIG. 2 is a schematic section view of a second embodiment of a heat-transfer label that is particularly well-suited for use on untreated polyethylene surfaces, the heat-transfer label being constructed according to the teachings of the present invention.

Referring now to FIG. 2, there is shown a schematic section view of a second embodiment of a heat-transfer label that is particularly well-suited for use on polyethylene surfaces, including high-density and low-density polyethylene containers, the heat-transfer label being constructed according to the teachings of the present invention and being represented generally by reference numeral 111.

Label 111 comprises a support portion 113. Support portion 113 is preferably a paper carrier web, but could also be a polypropylene film. Label 111 also preferably comprises a conventional wax release layer 115 overcoated on top of support portion 113.

Label 111 further comprises a transfer portion 121. Transfer portion 121, in turn, preferably includes a protective lacquer layer 123 printed directly on top of a portion of wax release layer 115, an ink design layer 125 printed onto a desired area of lacquer layer 123, and a heat-activatable adhesive layer 127 printed over design layer 125 and onto a surrounding portion of wax release layer 115.

Protective lacquer layer 123 preferably comprises a hard polyester or acrylic resin, as well as an adhesion promoter for adhering layer 123 to layer 125 (as well as for helping to adhere layer 123 to layers 127 and 115) as layers 123, 125 and 127 are successively formed on top of one another. Without wishing to be limited to any particular theory of the invention, it is believed that, if transfer portion 121 is not fixed sufficiently to wax release layer 115 (primarily due to a lack of adhesion between layers 123 and 125), then a shrinkage or expansion of one or more of the constituent layers of transfer portion 121 occurs during the heating (i.e. drying) step occurring after deposition of each of layers 123, 125 and 127 or during thermal transfer, such a shrinkage or expansion of the transfer portion typically rendering the label unacceptable. It is also believed that this phenomenon of shrinkage or expansion (hereinafter referred to generically as "shrinkage") is caused because the heating step causes the wax release layer 115 to melt partially and to flow relative to the layers printed thereonto. It is further believed that this phenomenon of shrinkage, which is experienced by label 111, is not similarly experienced by label 11, due to the comparatively greater amount of wax contained in label 111.

A particularly preferred example of the aforementioned adhesion promoter is a chlorinated polypropylene of the type commercially available as Eastman Chemical Products, Inc. CP-343-1 chlorinated polyolefin (which is described in Eastman Chemicals Publication No. GN-362, February, 1985, the disclosure of which is incorporated herein by reference), said CP-343-1 chlorinated polyolefin being a chlorinated polypropylene having a specific gravity, 25°/25° C., of 1.025, a Flash point, Tag Closed Cup, of 525° F., a hardness (Tukon), ASTM D 1474, of <1 knoops and a softening range of 175–205° F.

To form lacquer layer 123, a suitable lacquer composition is deposited onto a desired area of wax release layer 115, preferably by gravure printing or a similar technique. After deposition of the lacquer composition on the desired area of wax release layer 115, the deposited layer is heated, causing the volatile solvent component(s) to evaporate and leaving only the non-volatile components thereof to make up lacquer layer 123. A particularly preferred example of such a lacquer composition is as follows:

| Component | Percentage by weight |
|---|---|
| ViTEL ® 2300 polyester resin | 23.5 |
| castor oil | 1.07 |
| toluene | 30.1 |
| methyl ethyl ketone (MEK) | 22.5 |
| ethyl acetate | 22.5 |

Then, CP-343-1 chlorinated polyolefin is added to the aforementioned mixture in an amount constituting 7%, by weight, of the total composition.

Another particularly preferred example of a lacquer composition for use in making layer 123 is 75% Formulation A (25% by weight ViTEL® 2300, 37.5 by weight MEK and 37.5% by weight toluene) +25% Formulation B (20% by weight CP-343-1 chlorinated polyolefin and 80% by weight toluene).

An alternative, albeit less preferred, example of a lacquer composition is the following:

| Component | Percentage by weight |
|---|---|
| ELVACITE ® 2045 acrylic resin (a high molecular weight isobutyl methacrylate resin having an inherent viscosity of 0.64 as measured in a solution containing 0.25 g of polymer in 50 ml methylene chloride, measured at 20° C. using a No. 50 Cannon-Fenske Viscometer and commercially available from ICI Acrylics Inc., Wilmington, DE) | about 17 |
| CP-343-1 chlorinated polyolefin | about 8 |
| BENZOFLEX ® S-404 glyceryl tribenzoate | about 1.5 |
| toluene or a similarly suitable volatile organic solvent (e.g. xylene) | 73.5 |

Another alternative, albeit less preferred, example of a lacquer composition is the following:

| Component | Percentage by weight |
|---|---|
| ViTEL ® 2700 polyester resin (a copolyester resin available from Shell Chemical Company (Akron, OH) having a high tensile strength of 7000 psi, a low elongation of 4%, a 78 D scale Shore Durometer hardness, and a 142° C. ring and ball melt flow point) | 24 |
| CP-343-1 solid (powder) chlorinated polyolefin | 7 |
| n-propyl acetate | 27.6 |
| toluene | 41.4 |

Ink design layer 125 of transfer portion 121 preferably comprises an acrylic ink, which may be a conventional acrylic ink. Ink design layer 125 is formed in the conventional manner by depositing, by gravure printing or the like, an ink composition comprising the ink(s) and one or more suitable volatile solvents onto one or more desired areas of lacquer layer 123. After application of the ink composition onto lacquer layer 123, the deposited layer is heated, causing the volatile component of the ink composition to evaporate and leaving only the non-volatile component to form layer 125.

A preferred example of an ink composition for use in making ink design layer 125 is the following:

| Component | Percentage by weight |
|---|---|
| ELVACITE ® 2045 acrylic resin | 25 |
| methyl ethyl ketone | 32.5 |
| toluene | 32.5 |
| organic pigment | 12.5 |

An alternative preferred example of an ink composition for use in making ink design layer 125 is the following:

| Component | Percentage by weight |
|---|---|
| ELVACITE ® 2013 acrylic resin (a low molecular weight methyl/n-butyl methacrylate copolymer having an inherent viscosity of 0.17 as measured in a solution containing 0.25 g of polymer in 50 ml methylene chloride, measured at 20° C., using a No. 50 Cannon-Fenske Viscometer and commercially available from ICI Acrylics Inc., Wilmington, DE) | 20 |
| methyl ethyl ketone | 37 |
| SANTICIZER ® 0160 plasticizer (butyl benzyl phthalate) | 3 |
| $TiO_2$ | 40 |

One advantage of the latter ink composition, as compared to the former ink composition, is that the latter ink composition exhibits better opacity of color and better "lay-down" (i.e., printability) than does the former ink composition. This is, in large part, because the ELVACITE® 2013 acrylic resin has a lower viscosity than the ELVACITE® 2045 acrylic resin; consequently, more colorant can be added to an ELVACITE® 2013-containing ink than to an ELVACITE® 2045-containing ink while still meeting the viscosity requirements for printing the ink. Where the aforementioned ELVACITE® 2013-containing ink composition is used to form ink layer 125, it is preferable to overcoat layer 125 (as well as a surrounding area of layer 115 and any exposed portions of layer 123) with a layer (not shown) made from a composition identical to the ELVACITE® 2013-containing ink composition, except that it lacks a colorant. The purpose of the aforementioned overcoat layer is to improve adhesion between layer 125 and adhesive layer 127 since the amount of binder (i.e., acrylic resin) in an ELVACITE® 2013-containing layer 125 is comparatively low for ink design layers whereas the amount of colorant in an ELVACITE® 2013-containing layer 125 is comparatively high for ink design layers.

Adhesive layer 127 of label 111 is identical to adhesive layer 27 of label 11.

Label 111 is particularly well-suited for use with untreated high-density polyethylene articles, including untreated HDPE containers, and for use with low-density polyethylene articles, including untreated LDPE containers. Application of label 111 to such items is preferably performed in the conventional thermal-transfer manner by contacting adhesive layer 127 to the untreated high-density polyethylene container or other article, while applying sufficient heat to the bottom of support portion 113 so as to cause transfer portion 121 (and a portion of wax release layer 115) to be released from support portion 113 and so as to cause adhesive layer 127 to become heat-activated for bonding of transfer portion 121 to the desired article.

A particular embodiment of label 111 comprising (i) an adhesive layer 127 formed using the above-described preferred adhesive composition, (ii) an acrylic ink layer 125, (iii) a protective lacquer layer 123 formed using the above-described preferred lacquer composition, (iv) a wax release layer 115 and (v) a paper support 113 was used to decorate both untreated HDPE and LDPE containers by conventional thermal transfer. The particular label in question did not shrink or otherwise become distorted during printing or label transfer, and the thus transferred transfer portion 121 exhibited good interlayer adhesion and good adhesion to LDPE and HDPE containers, as measured by tape test. In addition, the LDPE containers thus labelled passed "wet-flex."

The embodiments of the present invention recited herein are intended to be merely exemplary and those skilled in the art will be able to make numerous variations and modifications to it without departing from the spirit of the present invention. For example, to achieve optimal label integrity and optimal adherence between a label and an article, even under conditions of chemical and/or mechanical degradation, one generally seeks to maximize the adhesion between the label and the article and generally seeks to maximize the interlayer adhesion of the various layers of the label. Accordingly, the particular types of materials used in the adhesive, ink and protective lacquer layers may be selected to optimize interlayer adhesion, article adhesion, and/or mechanical and chemical resistance suitable for the intended use of the article. In addition, the types of materials used in the various layers of the label may be selected with an eye towards the particular type of coating and/or printing processes that are to be used in the manufacture of the label. Notwithstanding the above, certain variations and modifications, while producing less than optimal results, may still produce satisfactory results. All such variations and modifications are intended to be within the scope of the present invention as defined by the claims appended hereto.

What is claimed is:

1. A heat-transfer label well-suited for untreated high-density polyethylene articles, said heat-transfer label comprising:
   (a) a support portion;
   (b) a transfer portion over said support portion for transfer of the transfer portion from the support portion to an untreated high-density polyethylene article upon application of heat to the support portion while the transfer portion is placed into contact with the untreated high-density polyethylene article, said transfer portion comprising
      (i) a protective lacquer layer, said protective lacquer layer comprising a release agent and at least one of a hard polyester resin and an acrylic resin,
      (ii) an ink layer over said protective lacquer layer, said ink layer comprising a polyamide ink, and
      (iii) an adhesive layer over said ink layer, said adhesive layer comprising a polyamide resin, a chlorinated polyethylene resin and an ethylene vinyl acetate resin; and
   (c) a wax-like skim coat interposed between said support portion and said transfer portion.

2. The heat-transfer label as claimed in claim 1 wherein said chlorinated polyethylene, when formulated as a 25% solution in xylene, has a specific gravity at 25/25° C. of 0.970, a Brookfield viscosity at 25° C., of 500–800 cP, a flash point, Tag Closed Cup, of 81° F., a fire point of 86° F. and a Gardner color of 12–15.

3. The heat-transfer label as claimed in claim 2 wherein said polyamide resin is a clear alcohol soluble polyamide resin based on dimerized vegetable acid and aliphatic polyamines and having a Brookfield viscosity at 160° C. of 4–7 poise, a softening point of 105–115° C. and a Gardner color (maximum) of 7.

4. The heat-transfer label as claimed in claim 3 wherein said ethylene vinyl acetate resin is a 39–42% vinyl acetate having a viscosity of 0.70 cP at 30° C. and 0.25 g in 1100 ml toluene, a bulk density of 30 lb/ft$^3$ (ASTM-D 1895/B), a ring and ball softening point of 200° C. and a melt index of 48–66 grams per 10 minutes (ASTM-D 1238 modified).

5. The heat-transfer label as claimed in claim 4 wherein said adhesive layer further comprises erucamide.

6. The heat-transfer label as claimed in claim 5 wherein said release agent is a surfactant or a wax.

7. The heat-transfer label as claimed in claim 6 wherein said release agent is selected from the group consisting of dioctyl sodium sulfosuccinate in mineral seal oil, ethoxylated alcohol and carnauba wax.

8. The heat-transfer label as claimed in claim 7 wherein said release agent is dioctyl sodium sulfosuccinate in mineral seal oil.

9. The heat-transfer label as claimed in claim 8 wherein said hard polyester or vinyl resin of said protective lacquer layer is a copolyester resin having a high tensile strength of 8000 psi, a low elongation of 7%, a 79 D scale Shore Durometer hardness, and a 156° C. ring and ball melt flow point.

10. The heat-transfer label as claimed in claim 9 wherein said protective lacquer layer further comprises nitrocellulose and castor oil.

11. The heat-transfer label as claimed in claim 10 wherein said support portion comprises polyethylene-coated paper.

12. A heat-transfer label well-suited for untreated polyethylene articles, said heat-transfer label comprising:
(a) a support portion;
(b) a transfer portion over said support portion for transfer of the transfer portion from the support portion to an untreated polyethylene article upon application of heat to the support portion while the transfer portion is placed into contact with the untreated polyethylene article, said transfer portion comprising
  (i) a protective lacquer layer, said protective lacquer layer comprising a chlorinated polypropylene and at least one of a hard polyester resin and an acrylic resin,
  (ii) an ink layer over said protective lacquer layer, said ink layer comprising an acrylic ink, and
  (iii) an adhesive layer over said ink layer, said adhesive layer comprising a polyamide resin, an ethylene vinyl acetate resin and a chlorinated polyethylene resin; and
(c) a wax release layer interposed between said support portion and said transfer portion.

13. The heat-transfer label as claimed in claim 12 wherein said chlorinated polyethylene, when formulated as a 25% solution in xylene, has a specific gravity at 25/25° C. of 0.970, a Brookfield viscosity at 25° C., of 500–800 cP, a flash point, Tag Closed Cup, of 81° F., a fire point of 86° F. and a Gardner color of 12–15.

14. The heat-transfer label as claimed in claim 13 wherein said polyamide resin is a clear alcohol soluble polyamide resin based on dimerized vegetable acid and aliphatic polyamines and having a Brookfield viscosity at 160° C. of 4–7 poise, a softening point of 105–115° C. and a Gardner color (maximum) of 7.

15. The heat-transfer label as claimed in claim 14 wherein said ethylene vinyl acetate resin is a 39–42% vinyl acetate having a viscosity of 0.70 cP at 30° C. and 0.25 g in 1100 ml toluene, a bulk density of 30 lb/ft$^3$ (ASTM-D 1895/B), a ring and ball softening point of 200° C. and a melt index of 48–66 grams per 10 minutes (ASTM-D 1238 modified).

16. The heat-transfer label as claimed in claim 15 wherein said adhesive layer further comprises erucamide.

17. The heat-transfer label as claimed in claim 16 wherein said chlorinated polypropylene of said protective lacquer layer has a specific gravity, 25°/25° C., of 1.025, a Flash point, Tag Closed Cup, of 525° F., a hardness (Tukon), ASTM D 1474, of <1 knoops and a softening range of 175–205° F.

18. The heat-transfer label as claimed in claim 16 wherein said hard polyester or acrylic resin of said protective lacquer layer is a copolyester resin having a high tensile strength of 8000 psi, a low elongation of 7%, a 79 D scale Shore Durometer hardness, and a 156° C. ring and ball melt flow point.

19. The heat-transfer label as claimed in claim 18 wherein said protective lacquer layer further comprises castor oil.

20. The heat-transfer label as claimed in claim 19 wherein said support portion is a sheet of paper.

21. An adhesive composition comprising:
(a) a polyamide resin;
(b) an ethylene vinyl acetate resin;
(c) a chlorinated polyethylene resin;
(d) erucamide;
(e) toluene;
(f) isopropyl alcohol; and
(g) ethyl acetate;
wherein said polyamide resin is a clear alcohol soluble polyamide resin based on dimerized vegetable acid and aliphatic polyamines and having a Brookfield viscosity at 160° C. of 4–7 poise, a softening point of 105–115° C. and a Gardner color (maximum) of 7, wherein said chlorinated polyethylene, when formulated as a 25% solution in xylene, has a specific gravity at 25/25° C. of 0.970, a Brookfield viscosity at 25° C., of 500–800 cP, a flash point, Tag Closed Cup, of 81° F., a fire point of 86° F. and a Gardner color of 12–15 and wherein said ethylene vinyl acetate resin is a 39–42% vinyl acetate having a viscosity of 0.70 cP at 30° C. and 0.25 g in 1100 ml toluene, a bulk density of 30 lb/ft$^3$ (ASTM-D 1895/B), a ring and ball softening point of 200° C. and a melt index of 48–66 grams per 10 minutes (ASTM-D 1238 modified).

22. A heat-activatable adhesive coating adapted to adhere to untreated polyethylene, said heat-activatable adhesive coating comprising:
(a) a polyamide resin;
(b) an ethylene vinyl acetate resin; and
(c) a chlorinated polyethylene resin.

23. The heat-activatable adhesive coating as claimed in claim 22 wherein said polyamide resin is a clear alcohol soluble polyamide resin based on dimerized vegetable acid and aliphatic polyamines and having a Brookfield viscosity at 160° C. of 4–7 poise, a softening point of 105–115° C. and a Gardner color (maximum) of 7, wherein said chlorinated polyethylene, when formulated as a 25% solution in xylene, has a specific gravity at 25/25° C. of 0.970, a Brookfield viscosity at 25° C., of 500–800 cP, a flash point, Tag Closed Cup, of 81° F., a fire point of 86° F. and a Gardner color of 12–15 and wherein said ethylene vinyl acetate resin is a 39–42% vinyl acetate having a viscosity of 0.70 cP at 30° C. and 0.25 g in 1100 ml toluene, a bulk density of 30 lb/ft$^3$ (ASTM-D 1895/B), a ring and ball softening point of 200° C. and a melt index of 48–66 grams per 10 minutes (ASTM-D 1238 modified).

24. A heat-transfer label comprising:
    (a) a support portion; and
    (b) a transfer portion over said support portion for transfer of the transfer portion from the support portion to an article upon application of heat to the support portion while the transfer portion is placed into contact with the article, said transfer portion comprising
        (i) an ink design layer, and
        (ii) an adhesive layer over said ink design layer, said adhesive layer comprising a chlorinated polyethylene resin, a polyamide resin and an ethylene vinyl acetate resin.

25. The heat-transfer label as claimed in claim 24 wherein said polyamide resin is a clear alcohol soluble polyamide resin based on dimerized vegetable acid and aliphatic polyamines and having a Brookfield viscosity at 160° C. of 4–7 poise, a softening point of 105–115° C. and a Gardner color (maximum) of 7, wherein said chlorinated polyethylene, when formulated as a 25% solution in xylene, has a specific gravity at 25/25° C. of 0.970, a Brookfield viscosity at 25° C., of 500–800 cP, a flash point, Tag Closed Cup, of 81° F., a fire point of 86° F. and a Gardner color of 12–15 and wherein said ethylene vinyl acetate resin is a 39–42% vinyl acetate having a viscosity of 0.70 cP at 30° C. and 0.25 g in 1100 ml toluene, a bulk density of 30 lb/ft$^3$ (ASTM-D 1895/B), a ring and ball softening point of 200° C. and a melt index of 48–66 grams per 10 minutes (ASTM-D 1238 modified).

26. The heat-transfer label as claimed in claim 25 wherein said adhesive layer further comprises an anti-blocking agent.

27. The heat-transfer label as claimed in claim 26 wherein said anti-blocking agent is erucamide.

28. The heat-transfer label as claimed in claim 27 further comprising a protective lacquer layer, said ink design layer being positioned over said protective lacquer layer.

29. The heat-transfer label as claimed in claim 27 wherein said ink design layer comprises an ink selected from the group consisting of polyamide inks and acrylic inks.

30. The heat-transfer label as claimed in claim 29 wherein said ink design layer comprises an acrylic ink, said acrylic ink comprising a low molecular weight methyl/n-butyl methacrylate copolymer.

31. The heat-transfer label as claimed in claim 30 further comprising an additional layer interposed between said ink design layer and said adhesive layer, said additional layer comprising a low molecular weight methyl/n-butyl methacrylate copolymer.

32. The heat-activatable adhesive coating as claimed 22 further comprising erucamide.

* * * * *